US010077838B2

(12) United States Patent
Pegg

(10) Patent No.: US 10,077,838 B2
(45) Date of Patent: *Sep. 18, 2018

(54) PISTON RING CONFIGURED TO REDUCE FRICTION

(71) Applicant: Ford Global Technologies, LLC, Dearborn, MI (US)

(72) Inventor: Ian Graham Pegg, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,400

(22) Filed: Jul. 11, 2016

(65) Prior Publication Data
US 2017/0009887 A1    Jan. 12, 2017

Related U.S. Application Data

(63) Continuation-in-part of application No. 15/194,151, filed on Jun. 27, 2016.

(30) Foreign Application Priority Data

Jul. 10, 2015    (GB) .................................. 1512125.4
Jul. 6, 2016     (EP) .................................. 16178148

(51) Int. Cl.
*F16J 9/00*    (2006.01)
*F16J 9/12*    (2006.01)
(Continued)

(52) U.S. Cl.
CPC ................ *F16J 9/12* (2013.01); *F16J 9/062* (2013.01); *F16J 9/206* (2013.01)

(58) Field of Classification Search
CPC ...... F16J 9/12; F16J 9/062; F16J 9/206; F16J 9/00; F16J 9/20; F16J 10/00; F16J 10/04
(Continued)

(56) References Cited

U.S. PATENT DOCUMENTS 1,560,307 A * 11/1925 Peeler ........................ F16J 9/20
                                                        277/447
3,938,814 A *  2/1976 Cromwell ............... F02B 77/02
                                                        277/444
(Continued)

FOREIGN PATENT DOCUMENTS

CN    204627772 U    9/2015
JP    S4724487 Y1    8/1972
(Continued)

OTHER PUBLICATIONS

Examination Report for European Patent Application No. 16178148. 9, dated Nov. 22, 2016, European Patent Office, 9 pages.
(Continued)

*Primary Examiner* — Nathan Cumar
(74) *Attorney, Agent, or Firm* — Andrew Hilton; McCoy Russell LLP

(57) ABSTRACT

A piston ring for a piston, the piston ring having a circumferential surface configured to engage an inner surface of a cylinder, the inner surface having at least one recess indented into the inner surface, the engagement of the circumferential surface of the piston ring with the inner surface of the cylinder defining a contact zone therebetween, wherein the circumferential surface of the piston ring is configured such that the ratio of the dimension of the contact zone the direction of travel of the piston to the dimension of the recess in the direction of travel of the piston is in the range of approximately 5:1 to 5:3.

12 Claims, 6 Drawing Sheets

(51) Int. Cl.
*F16J 9/06* (2006.01)
*F16J 9/20* (2006.01)

(58) Field of Classification Search
USPC .................................. 277/434, 436, 488
See application file for complete search history.

(56) References Cited

U.S. PATENT DOCUMENTS

| | | | | |
|---|---|---|---|---|
| 4,629,200 A | * | 12/1986 | Ruddy | F16J 9/28 123/193.6 |
| 5,241,748 A | * | 9/1993 | Ishida | C23C 8/38 29/888.074 |
| 5,598,763 A | * | 2/1997 | Rao | F16J 1/08 277/442 |
| 6,470,792 B1 | * | 10/2002 | Michel | F16J 9/20 92/208 |
| 2003/0021711 A1 | | 1/2003 | Klink et al. | |
| 2007/0101967 A1 | * | 5/2007 | Pegg | B23K 26/0078 123/196 M |
| 2010/0288222 A1 | | 11/2010 | Urabe et al. | |
| 2010/0307443 A1 | | 12/2010 | Sand | |
| 2014/0326131 A1 | | 11/2014 | Hofbauer et al. | |

FOREIGN PATENT DOCUMENTS

| | | |
|---|---|---|
| JP | 2002267016 A | 9/2002 |
| JP | 2007278090 A | 10/2007 |
| JP | 2008019718 A | 1/2008 |

OTHER PUBLICATIONS

Pegg, Ian Graham et al., "Bearing Interface with Recesses to Reduce Friction," U.S. Appl. No. 15/195,796, filed Jun. 28, 2016, 31 pages.

Pegg, Ian Graham, "Machine with Reduced Cylinder Friction," U.S. Appl. No. 15/196,587, filed Jun. 29, 2016, 42 pages.

Intellectual Property Office of the United Kingdom, Combined Search and Examination Report of GB1512125.4, dated Jan. 26, 2016, 5 pages.

* cited by examiner

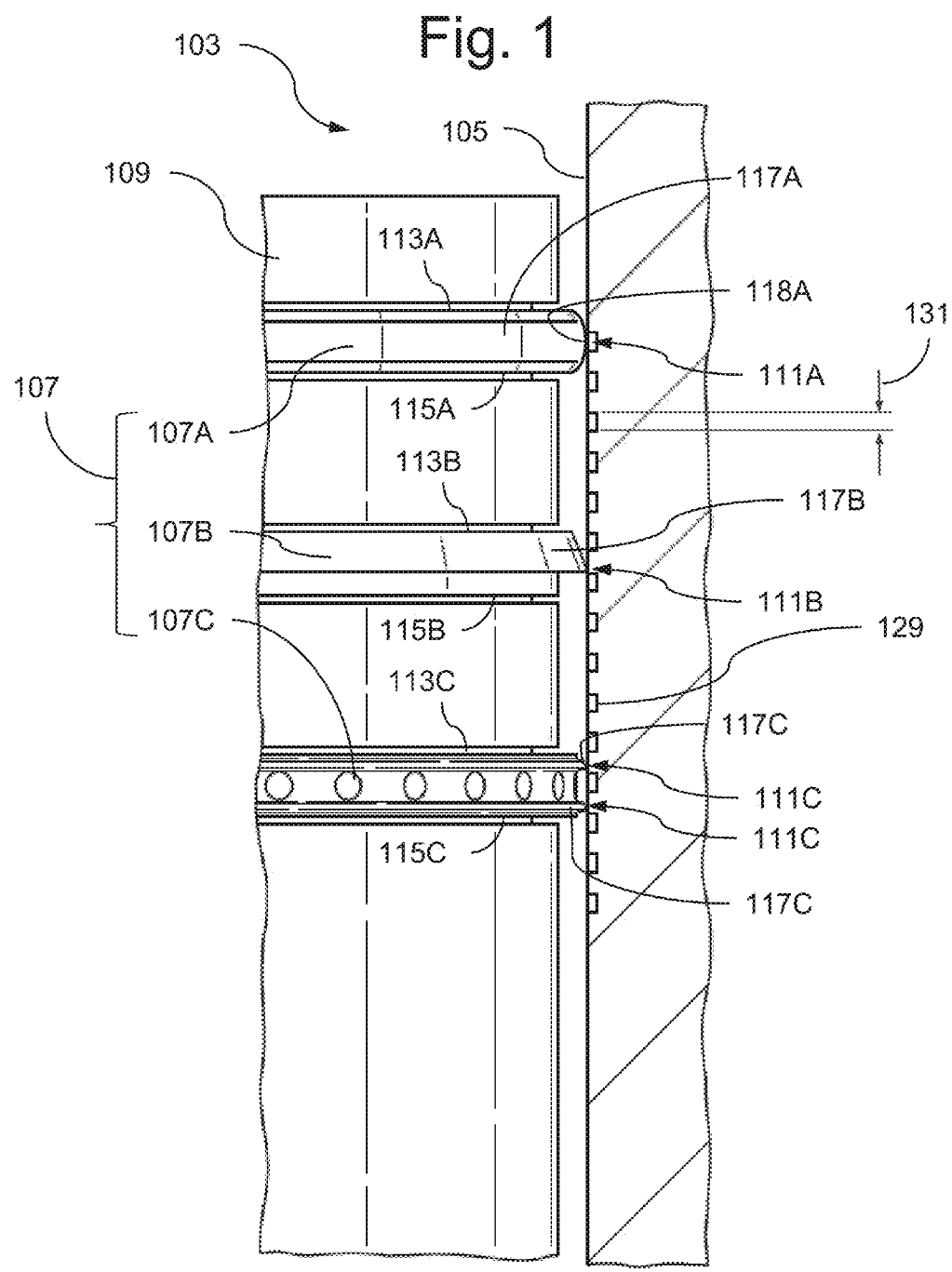

PRIOR ART

PISTON RING CONFIGURED TO REDUCE FRICTION

CROSS REFERENCE TO RELATED APPLICATION

The present application is a continuation-in-part of U.S. patent application Ser. No. 15/194,151, entitled "PISTON RING CONFIGURED TO REDUCE FRICTION", filed on Jun. 27, 2016, which claims priority to Great Britain Patent Application No. 1512125.4, filed Jul. 10, 2015. The present application also claims priority to European Patent Application No. 16178148.9, filed Jul. 6, 2016. The entire contents of U.S. patent application Ser. No. 15/194,151, filed on Jun. 27, 2016, Great Britain Patent Application No. 1512125.4, filed Jul. 10, 2015, and European Patent Application No. 16178148.9, filed on Jul. 6, 2016 are hereby incorporated by reference for all purposes.

INTRODUCTION

An internal combustion engine typically has one or more reciprocating pistons which are lubricated to reduce the friction as the piston slides within a cylinder bore. Lubricated sliding contacts, such as between the piston rings of a piston and an inner surface of the cylinder bore, have frictional losses due to the shear forces generated in the lubricant, contact between surface asperities, and boundary contacts caused by additives in the lubricant.

It is desirable to reduce the friction between the piston rings and the inner surface of the cylinder in order to increase the efficiency of the engine and reduce wear between engine components. The friction between the components may be determined by a number of factors, which include the operational parameters of the engine and the configuration of each of the sliding surfaces. For example, the frictional coefficient between sliding components may be determined using the Stribeck curve, which is used to categorise the frictional properties between two surfaces as a function of the viscosity of the lubricant and the relative speed between the components per unit load. As such, friction may be minimised by operating at the minimum point on the Stribeck curve, which defines the transition between hydrodynamic lubrication and mixed lubrication. However, it is difficult to maintain operation at the minimum point on the Stribeck curve across the full piston stroke as a result of the low relative speed between the piston and the cylinder at the extremes of the range of movement of the piston.

STATEMENTS OF INVENTION

According to a first aspect of the present disclosure there is provided a piston ring for a piston. The piston may be a piston of a machine having rotary and reciprocating motion, for example the piston may be a piston of an internal combustion engine, a compressor or a vacuum pump. The piston may be a piston of a machine having only reciprocating motion such as a linear actuator. The piston ring has a circumferential surface. The cylinder has an inner surface. The circumferential surface is configured to engage the inner surface. The term 'engage' is intended to encompass two surfaces that are separated by a thin film of lubricant, as well as surfaces that come into direct physical contact. The inner surface of the cylinder may be the inner surface of a cylinder bore of a cylinder block. The inner surface of the cylinder may be the inner surface of a cylinder liner for a cylinder bore. The inner surface comprises at least one recess indented into the inner surface, for example a pocket that is configured to retain a lubricant.

The engagement of the circumferential surface of the piston ring with the inner surface of the cylinder defines a contact zone between the circumferential surface and the inner surface. The circumferential surface may have a contacting portion configured to engage the inner surface of the cylinder. The circumferential surface may have a non-contacting portion configured to be spaced apart from the inner surface of the cylinder. In this manner, the piston ring may be configured such that only a portion of the circumferential surface, i.e. not all of the circumferential surface, is engaged with the inner surface of the cylinder during operation of the machine. The contacting portion of the circumferential surface may define the contact zone between the circumferential surface and the inner surface.

The contact zone has a dimension in the direction of travel of the piston, for example an axial dimension that defines the overall length of the contact zone in the direction of travel of the piston. The contact zone may have a maximum dimension in the direction of travel of the piston. The portion of the circumferential surface that engages the inner surface may define the maximum dimension of the contact zone in the direction of travel of the piston. The circumferential surface of the piston ring may be configured when new such that the dimension of the contact zone in the direction of travel of the piston is greater than the dimension of the recess in the direction of travel of the piston. The circumferential surface of the piston ring may be configured such that the ratio of the dimension of the contact zone in the direction of travel of the piston to the dimension of the recess in the direction of travel of the piston is in the range of approximately 5:1 to 5:3. For example, the recess may have a maximum dimension of approximately 60 μm in the direction of travel of the piston. The circumferential surface of the piston ring may be configured to provide a contact zone having a dimension of approximately 100 to 300 μm in the direction of travel of the piston. In this manner, the circumferential surface of the piston ring may be configured to cover, i.e. completely span, an opening of a recess to prevent a lubricant from leaking out of the recess. In possible arrangements, the range may be 5:1 to 5:2 or 5:2 to 5:3.

The piston ring may be configured such that at least a portion of the circumferential surface of the piston ring is parallel to the inner surface of the cylinder during operation of the engine. The piston ring, for example the circumferential surface of the piston ring, may be configured to deform elastically upon engagement with the inner surface of the cylinder. The dimension, for example the maximum dimension, of the contact zone in the direction of travel of the piston may be defined by the dimension, for example the maximum dimension, of the elastically deformed portion of the circumferential surface in the direction of travel of the piston. The dimension of the elastically deformed portion in the direction of travel of the piston may be greater than the dimension of the recess in the direction of travel of the piston.

A film of lubricant may be provided in the contact zone between the circumferential surface of the piston ring and the inner surface of the cylinder during operation of the engine. The film of lubricant may have a film thickness that is substantially constant in the direction of travel of the piston during operation of the engine. The circumferential surface of the piston ring may be configured to support a film of lubricant having a dimension in the direction of travel of the piston that is greater than the dimension of the recess in the direction of travel of the piston. For example, the parallel portion of the circumferential surface may have a dimension in the direction of travel of the piston that is sufficiently large to support a film of lubricant having a dimension in the direction of travel of the piston that is greater than the dimension of the recess in the direction of travel of the piston.

The piston ring may comprise a plurality of the circumferential surfaces. For example, each circumferential surfaces of the piston ring may engage the inner surface and provide respective contact zones.

The piston ring may be a compression ring, for example a barreled piston ring. The piston ring may be an oil scraper ring, for example a tapered piston ring or a napier ring. The piston ring may be an oil control ring, for example a two-piece oil control ring, each piece having a circumferential surface.

A machine may be provided comprising one or more of the above-mentioned piston rings. The machine may be a machine having rotary and reciprocating motion, for example the machine may be an internal combustion engine, a compressor or a vacuum pump. The machine may be a machine having only reciprocating motion, such as a linear actuator. A vehicle may be provided comprising one or more of the above-mentioned piston rings and/or machines.

According to another aspect of the present disclosure there is provided a piston ring set for a piston. Each of the piston rings has a circumferential surface configured to engage an inner surface of a cylinder. The inner surface of the cylinder has at least one recess indented into the inner surface. The engagement of the circumferential surface of each piston ring with the inner surface of the cylinder defines a contact zone between the circumferential surface and the inner surface. For example, the piston ring set may comprise a plurality of pistons rings each having a circumferential surface that is configured to engage the inner surface, which results in the piston ring set defining a plurality of contact zones when installed in the cylinder. Each of the contact zones has a dimension in the direction of travel of the piston, for example an axial dimension that defines the overall length of the contact zone in the direction of travel of the piston. The contact zones may each have a maximum dimension in the direction of travel of the piston. The portion of each circumferential surface that engages the inner surface may define the maximum dimension of the contact zone in the direction of travel of the piston. The circumferential surface of each piston ring may be configured such that the dimension of the contact zone in the direction of travel of the piston is greater than the dimension of the recess in the direction of travel of the piston. The circumferential surface of each piston ring may be configured such that the ratio of the dimension of the contact zone in the direction of travel of the piston to the dimension of the recess in the direction of travel of the piston is in the range of approximately 5:1 to 5:3. In possible arrangements, the range may be 5:1 to 5:2 or 5:2 to 5:3.

The piston ring set may have a first piston ring being configured such that the ratio of the dimension of a contact zone, for example a first contact zone, in the direction of travel of the piston to the dimension of the recess in the direction of travel of the piston is in the range of approximately 5:1 to 5:3. The piston ring set may have a second piston ring being configured such that the ratio of the dimension of a contact zone, for example a second contact zone, in the direction of travel of the piston to the dimension of the recess in the direction of travel of the piston is in the range of approximately 5:1 to 5:3 and is different to that of the first piston ring. For example, the ratio of the dimension of the recess in the direction of travel of the piston to the dimension of the first contact zone in the direction of travel of the piston may be different to ratio of the dimension of the recess in the direction of travel of the piston to the dimension of the second contact zone in the direction of travel of the piston.

According to another aspect of the present disclosure there is provided a method of designing, forming and/or manufacturing a piston ring for a piston. The piston may be a piston of a rotary and/or reciprocating machine. For example, the piston may be a piston of an internal combustion engine. The piston ring has a circumferential surface. The cylinder has an inner surface. The circumferential surface and the inner surface are configured to engage each other. The inner surface of the cylinder may be the inner surface of a cylinder bore of a cylinder block. The inner surface of the cylinder may be the inner surface of a cylinder liner for a cylinder bore. The inner surface comprises at least one recess indented into the inner surface, for example a pocket that is configured to retain a lubricant. The engagement of the circumferential surface of the piston ring with the inner surface of the cylinder defines a contact zone between the circumferential surface and the inner surface. The contact zone may have a maximum dimension in the direction of travel of the piston. The portion of the circumferential surface that engages the inner surface may define the maximum dimension of the contact zone in the direction of travel of the piston. The method comprises determining the dimension of the recess in the direction of travel of the piston. The method may comprise designing, forming and/or manufacturing the circumferential surface of the piston ring such that the dimension of the contact zone in the direction of travel of the piston is greater than the dimension of the recess in the direction of travel of the piston. The method may comprise designing, forming and/or manufacturing the piston ring so that the ratio of the dimension of the contact zone in the direction of travel of the piston to the dimension of the recess in the direction of travel of the piston is in the range of approximately 5:1 to 5:3. In possible arrangements, the range may be 5:1 to 5:2 or 5:2 to 5:3.

According to another aspect of the present disclosure there is provided an engine having one or more piston rings. Each piston ring has a circumferential surface that is configured to engage an inner surface of a cylinder of an engine. The portion of the piston ring that engages the inner surface defines a contact zone between the inner surface of the cylinder and the circumferential surface of the piston ring. The contact zone has a dimension in the direction of travel of the piston, for example an axial dimension that defines the overall length of the contact zone in the direction of travel of the piston. The inner surface has at least one recess indented into the inner surface. The recess has a dimension in the direction of travel of the piston, for example an axial dimension that defines the overall length of the recess in the direction of travel of the piston. The circumferential surface of the piston ring may be configured such that the dimension of the contact zone in the direction of travel of the piston is greater than the dimension of the recess in the direction of travel of the piston. The circumferential surface of the piston ring may be configured such that the ratio of the dimension of the contact zone in the direction of travel of the piston to the dimension of the recess in the direction of travel of the piston is in the range of approximately 5:1 to 5:3. In possible arrangements, the range may be 5:1 to 5:2 or 5:2 to 5:3.

The inner surface may comprise a top region having a plurality of recesses indented into the inner surface. The top region may extend towards the bottom end of the cylinder away from a contact zone between a top piston ring and the inner surface when the piston is at top dead centre of a stroke. The inner surface may comprise a bottom region having a plurality of recesses indented into the inner surface. The bottom region may extend towards the top end of the cylinder away from a contact zone between a bottom piston ring and the inner surface when the piston is at bottom dead centre of the stroke of the piston. The inner surface may be an inner surface of a bore of a cylinder block. The inner surface may be an inner surface of a cylinder liner.

The recesses may be configured to retain a fluid. For example, each recess may comprise a pocket configured to trap the fluid in the inner surface. The recesses may be configured to slow down the rate at which fluid drains away from the top and/or bottom regions of the inner surface. The top region and the bottom region may be separated by a middle region having no recesses indented into the inner surface. The top region and the bottom region may be spaced apart, for example by the middle region, in the direction of travel of the piston.

The top region may comprise a top band of recesses extending around the full circumference of the inner surface. The bottom region may comprise a bottom band of recesses extending around the full circumference of the inner surface. The middle region may comprise a middle band having no recesses extending around the full circumference of the inner surface. The top band may have an axial dimension in the direction of travel of the piston. The bottom band may have an axial dimension in the direction of travel of the piston. The middle band may have an axial dimension in the direction of travel of the piston. The axial dimension of the middle band may be greater than the axial dimension of the top and/or bottom bands.

The contact zone between the piston ring and the inner surface of the cylinder may comprise a region bounded by the circumferential contact between a top edge of the piston ring and the inner surface, and a bottom edge of the piston ring and the inner surface.

The contact zone, for example a top contact zone, between the top piston ring and the inner surface of the cylinder may comprise a region bounded by the circumferential contact between a top edge of the top piston ring and the inner surface, and a bottom edge of the top piston ring and the inner surface when the piston is at top dead centre of a stroke.

The contact zone, for example a bottom contact zone, between the bottom piston ring and the inner surface of the cylinder may comprise a region bounded by the circumferential contact between a top edge of the bottom piston ring and the inner surface, and a bottom edge of the bottom piston ring and the inner surface when the piston is at top dead centre of a stroke.

The top region may be offset, for example by a predetermined distance, from the contact zone between the top piston ring and the inner surface when the piston is at top dead centre of a stroke. The top region may be offset from the top contact zone towards the bottom region. The top region may be offset by approximately 1 mm from the contact zone between the top piston ring and the inner surface when the piston is at top dead centre of a stroke.

The bottom region may be offset, for example by a predetermined distance, from the contact zone between the bottom piston ring and the inner surface when the piston is at bottom dead centre of a stroke. The bottom region may be offset from the bottom contact zone towards the top region. The bottom region may be offset by approximately 1 mm from the contact zone between the bottom piston ring and the inner surface when the piston is at bottom dead centre of a stroke.

The top region may extend from the top edge of the top piston ring when the piston is at top dead centre of a stroke. The top region may extend from the bottom edge of the top piston ring when the piston is at top dead centre of a stroke. The top region may extend from in between the top and bottom edges of the top piston ring when the piston is at top dead centre of a stroke.

The bottom region may extend from the top edge of the bottom piston ring when the piston is at bottom dead centre of a stroke. The bottom region may extend from the bottom edge of the bottom piston ring when the piston is at bottom dead centre of a stroke. The bottom region may extend from in between the bottom and top edges of the bottom piston ring when the piston is at bottom dead centre of a stroke. The top region and the bottom region may extend towards each other.

According to another aspect of the present disclosure there is provided a method of designing, forming and/or manufacturing an engine. The engine has one or more piston rings. Each piston ring has a circumferential surface that is configured to engage an inner surface of a cylinder of an engine. The portion of the piston ring that engages the inner surface defines a contact zone between the inner surface of the cylinder and the circumferential surface of the piston ring. The contact zone has a dimension in the direction of travel of the piston, for example an axial dimension that defines the overall length of the contact zone in the direction of travel of the piston. The inner surface has at least one recess indented into the inner surface. The recess has a dimension in the direction of travel of the piston, for example an axial dimension that defines the overall length of the recess in the direction of travel of the piston. The method comprises determining the dimension of the recess in the direction of travel of the piston. The method may comprise designing, forming and/or manufacturing the circumferential surface of the piston ring such that the dimension of the contact zone in the direction of travel of the piston is greater than the dimension of the recess in the direction of travel of the piston. The method may comprise designing, forming and/or manufacturing the piston ring so that the ratio of the dimension of the contact zone in the direction of travel of the piston to the dimension of the recess in the direction of travel of the piston is in the range of approximately 5:1 to 5:3. In possible arrangements, the range may be 5:1 to 5:2 or 5:2 to 5:3.

According to an aspect of the present disclosure there is provided a bearing interface of an apparatus, for example an engine or a gear box. The apparatus has a first element and a second element. The first element may be configured to move, for example slide and/or rotate, relative to the second element during operation of the apparatus. The second element may be configured to move, for example slide and/or rotate, relative to the first element during operation of the apparatus. The first element may be fixed, for example stationary, relative to the second element during operation of the apparatus. The second element may be fixed, for example stationary, relative to the first element during operation of the apparatus. The first element comprises a first bearing surface. The second element comprises a second bearing surface. The first and second bearing surfaces are configured to engage each other. The first bearing surface is configured to engage at least a portion of a second bearing surface. The portion of the second element that engages the first element defines a contact zone between the first bearing surface and the second bearing surface. The first bearing surface has at least one recess, for example a pocket, indented into the first bearing surface. The second bearing surface may be configured such that the dimension of the contact zone in the direction of movement of the second element is greater than the dimension of the recess in the direction of movement of the second element. The second bearing surface may be configured such that the ratio of the dimension of the contact zone in the direction of movement of the second element to the dimension of the recess in the direction of movement of the second element is in the range of approximately 5:1 to 5:3. In possible arrangements, the range may be 5:1 to 5:2 or 5:2 to 5:3.

According to another aspect of the present disclosure there is provided a method of designing, forming and/or manufacturing a bearing interface of an apparatus, for example an engine or a gearbox. The apparatus comprises a first element and a second element. The first element may be configured to move, for example slide and/or rotate, relative to the second element during operation of the apparatus. The second element may be configured to move, for example slide and/or rotate, relative to the first element during operation of the apparatus. The first element may be fixed, for example stationary, relative to the second element during operation of the apparatus. The second element may be fixed, for example stationary, relative to the first element during operation of the apparatus. The first element comprises a first bearing surface. The second element comprises a second bearing surface. The first and second bearing surfaces are configured to engage each other. The first bearing surface is configured to engage at least a portion of a second bearing surface. The portion of the second bearing surface that engages the first bearing surface defines a contact zone between the first bearing surface and the second bearing surface. The first bearing surface has at least one recess, for example a pocket, indented into the first bearing surface. The method comprises determining the dimension of the contact zone in the direction of movement of the second element. The method may comprise designing, forming and/or manufacturing the second bearing surface such that the dimension of the contact zone in the direction of movement of the second element is greater than the dimension of the recess in the direction of movement of the second element. The method may comprise designing, forming and/or manufacturing the second bearing surface such that the ratio of the dimension of the contact zone in the direction of movement of the second element to the dimension of the recess in the direction of movement of the second element is in the range of approximately 5:1 to 5:3. In possible arrangements, the range may be 5:1 to 5:2 or 5:2 to 5:3.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIG. 1 shows a detailed view of piston rings of an engine piston according to the prior art;

DETAILED DESCRIPTION

Figure 2A:
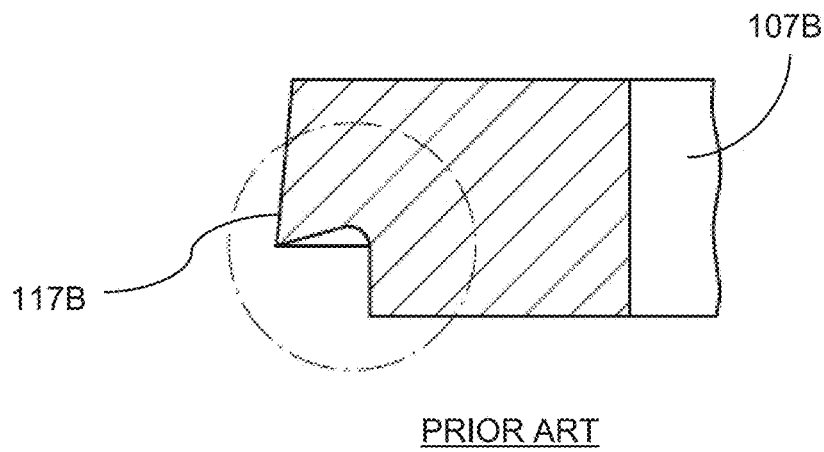
FIG. 2A shows a partial cross section of a piston ring according to the prior art.

FIG. 1 shows a simplified cross-section of a cylinder 103 of an engine. The engine may be any type of engine, for example a single overhead camshaft (SOHC) engine, a double overhead camshaft (DOHC) engine, an overhead valve (OHV) engine, or other appropriate type of engine. The engine may comprise any appropriate number of cylinders 103, for example the engine may be a three-cylinder engine, a six-cylinder engine or an eight-cylinder engine. The cylinders 103 may be arranged in an appropriate configuration, such as in-line, horizontally opposed or V-form.

Each of the cylinders 103 comprises an inner surface 105 configured to engage the piston rings 107 of an engine piston 109. The inner surface 105 may be an inner surface of a cylinder bore formed directly into a cylinder block of the engine. Alternatively, the inner surface 105 may be an inner surface of a cylinder liner that is assembled into the cylinder block.

During operation of the engine, each of the pistons 109 reciprocates within the cylinder 103 between a top dead centre position and a bottom dead centre position. In the context of the present disclosure, the term "top dead centre" refers to the furthest point of a piston's travel, at which it changes from an upward stroke, i.e. away from a crankshaft of the engine, to a downward stroke, i.e. towards the crankshaft of the engine. The term "bottom dead centre" refers to the furthest point of a piston's travel, at which it changes from a downward to an upward stroke. In a similar manner, the term "top" end of the cylinder 103 refers to an end of the cylinder 103 at which the piston 109 reaches top dead centre, and the term "bottom" end of the cylinder 103 refers to an end of the cylinder 103 at which the piston 109 reaches bottom dead centre.

During the operation of the engine, the linear speed of the piston 109 varies between a minimum speed, for example a zero speed when the piston is stationary relative to cylinder 103 at top dead centre or bottom dead centre, and a maximum speed as the piston 109 moves between top centre and bottom dead centre. As a result of the change in speed of the piston 109, the coefficient of friction between the piston rings 107 and the inner surface 105 of the cylinder varies as the piston 109 travels within the cylinder bore.

In order to reduce the friction between the sliding components of the engine, such as the piston rings 107 and the inner surface 105 of the cylinder, a lubricant may be used.

The frictional coefficient between sliding components may be determined using the Stribeck curve, which is used to categorise the frictional properties between two surfaces as a function of the viscosity of the lubricant and the relative speed between the components per unit load. Friction may be minimised by operating at the minimum point on the Stribeck curve, which defines the tribological transition between hydrodynamic lubrication and mixed lubrication. However, it is difficult to maintain operation at the minimum point on the Stribeck curve across the full piston stroke as a result of the cyclical acceleration and deceleration of the piston 109. For example, it is difficult to maintain hydrodynamic lubrication towards the top and bottom ends of the piston stroke owing to the low relative speeds between the piston 109 and the cylinder 103. In particular, at the ends of the travel of the piston 109, where the piston speed drops to zero, a lubricant film between the piston rings 107 and the inner surface 105 of the cylinder 103 can collapse as there is no motion to form a hydrodynamic lubricant film. The collapse of the film is dependent on how fast the lubricant can drain away from a contact zone 111 between the piston rings 107 and the inner surface 105 of the cylinder 103.

FIG. 1 shows the contact zones 111A, 111B, 111C between the piston rings 107 and the inner the surface 105 of the cylinder 103. In the arrangement shown in FIG. 1, the piston 109 has a top piston ring 107A, a middle piston ring 107B and a bottom piston ring 107C. However, the piston 109 may have any appropriate number of piston rings 107. Each of the piston rings 107 may be configured to perform a different function, for example top piston ring 107A may be a compression ring configured to provide a seal between the top and bottom of the cylinder 103 on either side of the piston 109, the middle piston ring 107B may be and oil scraper ring configured to remove excess oil from the inner surface 105 of the cylinder 103, and the bottom piston ring may be an oil control ring configured to control the amount of oil supplied to lubricate the contact between the piston rings 107 and the inner surface 105.

As a result of their different functions, each of the piston rings 107 has a different configuration. For example, the top piston ring 107A has a curved, e.g. a barreled profile, the middle piston ring 107B has a tapered profile and the bottom piston ring has a contoured profile comprising a plurality of projections configured to engage the inner surface 105 of the cylinder. The profile of each of the piston rings 107 may however have any appropriate shape/form depending on the desired function of the piston ring 107.

Figure 2B:
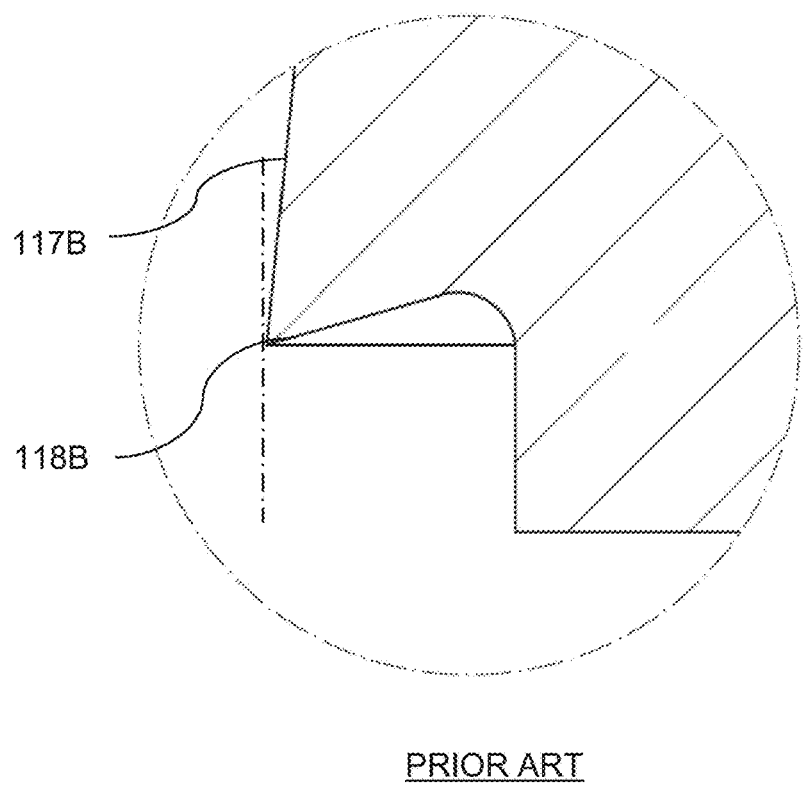
FIG. 2B shows a detailed view of the piston ring of FIG. 2A.
Figure 3A:
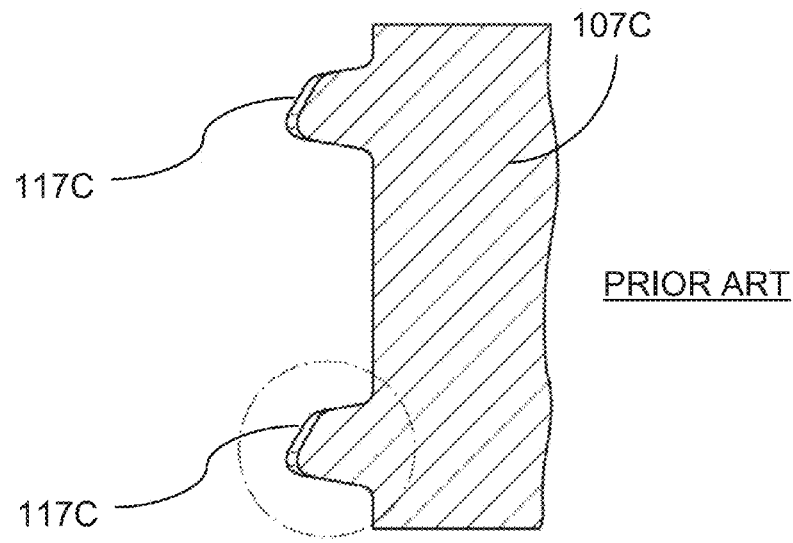
FIG. 3A shows a partial cross section of a piston ring according to the prior art.
Figure 3B:
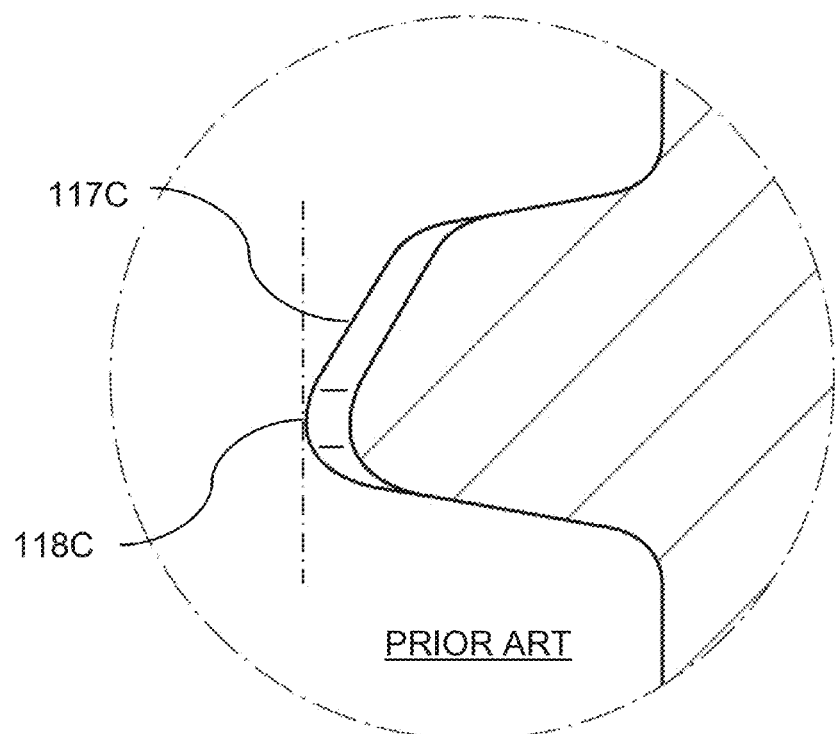
FIG. 3B shows a detailed view of the piston ring of FIG. 3A.

The top, middle and bottom piston rings 107A, 107B 107C each comprise a circumferential surface 117A, 117B, 117C configured to engage the inner surface 105 of the cylinder 103. The circumferential surface 117A of the top piston ring comprises a high point 118A, for example a maximum radial dimension of the top piston ring 107A that engages the inner surface. FIG. 2A shows a detailed view of the circumferential surface 117B of the middle piston ring 107B, and FIG. 2B shows a detailed view of a high point 118B on the circumferential surface 117B, for example a maximum radial dimension of the middle piston ring 107B. FIG. 3A shows a detailed view of the circumferential surface 117C of the bottom piston ring 107C, and FIG. 3B shows a detailed view of a high point 118C on the circumferential surface 117C, for example a maximum radial dimension of the bottom piston ring 107C.

The portion of the circumferential surface 117A, 117B, 117C that engages the inner surface defines the contact zone 111 between each of the piston rings 107 and the inner surface 105 of the cylinder 103. The circumferential surface 117A of the top piston ring 107A engages the inner surface 105 at the highest point on the curved profile of the circumferential surface 117A, thereby establishing a contact zone 111A, e.g. a line contact, between the circumference of top piston ring 107A and inner surface 105. The circumferential surface 117B of the middle piston ring 107B engages the inner surface 105 at the highest point 118B on the tapered profile of the circumferential surface 117B, thereby establishing a contact zone 111B, e.g. a line contact, between the circumference of middle piston ring 107B and inner surface 105. The circumferential surface 117C of the bottom piston ring 107B engages the inner surface 105 at the highest point 118C on each of the two projections of the circumferential surface 117C, thereby establishing two contact zones 111C, e.g. line contacts, between the circumference of bottom piston ring 107C and inner surface 105.

The inner surface 105 of the cylinder 103 comprises a plurality of recesses 129 indented into the inner surface 105. The recesses 129 may comprise any type opening in the inner surface 105 that enables a fluid, such as a lubricant, to be held within the opening as the piston ring 107 moves over the opening. For example, the recesses 129 may comprise a plurality of pockets shaped to retain lubricant, and/or decrease the rate at which lubricant drains away from the contact zones 111. The pockets may be of any shape, for example the pockets may be square, rectangular, circular or any other shape. In one arrangement, the pockets may be of a similar shape to each other. In another arrangement, the plurality of pockets may comprise a number of differently formed/shaped pockets, for example the plurality of pockets may comprise a number of round-bottomed pockets and a number of square-bottomed pockets that are configured to trap lubricant.

For the pockets to be effective, lubricant needs to be restricted from "leaking" out of the pocket as the piston ring 107 travels over it. This can be achieved by having a contact zone 111 that is larger than an opening 131 of the recess 129 in the direction of travel of the piston 109. However, as shown in FIG. 1, each of the piston rings 107 of the prior art has a circumferential surface shaped to provide a line contact between the piston ring 107 and the inner surface 105. As a result, lubricant is able to leak out of the recess 129 as the piston ring 107 travels over the pocket as the circumferential surface is not shaped to cover the opening 131 of the recess 129. In such an arrangement, the dimension of the contact zone 111 in the direction of travel of the piston 109 is less than the dimension of the pocket in the direction of travel of the piston 109. Indeed, in those arrangements where the piston rings 107 have curved or sharp-edged profiles, the dimension of the contact zone 111 in the direction of travel of the piston 109 may be negligible. In order to prevent the lubricant from leaking out of the pocket, the piston rings 107 may be designed such that the circumferential surface is configured to provide a contact zone 111 having an overall dimension in the direction of travel of the piston 109 that is greater than the dimension of the pocket, for example the dimension of the opening 131 of the recess 129, in the direction of travel of the piston 109. In this manner, the piston rings are able to prevent lubricant from leaking out of the pockets as the piston rings travel over the pockets.

The dimension of the contact zone 111 in the direction of travel of the piston 109 may be defined by the size, e.g. axial length, of an elastic contact zone between the inner surface 105 and a portion of the circumferential surface of the piston ring 107 that deforms elastically under loading. For example, the dimension of the contact zone 111 in the direction of travel of the piston 109 may be defined by a portion of the curved or tapered profile that deforms elastically to provide a portion of the circumferential surface that is parallel with the inner surface 105 of the cylinder 103. The size of the elastic contact zone may be dependent upon the radial loading of the piston ring 107 against the inner surface 105, the shape/form of the circumferential surface of the piston ring 107, and/or the material properties, e.g. the Young's modulus, of the respective surfaces. In order to prevent the lubricant from leaking out of the pocket, the piston rings 107 may be designed such that the circumferential surface is configured to deform by a predetermined amount so as to provide an elastic contact zone having an overall dimension in the direction of travel of the piston 109 that is greater than the dimension of the pocket.

Figure 4:
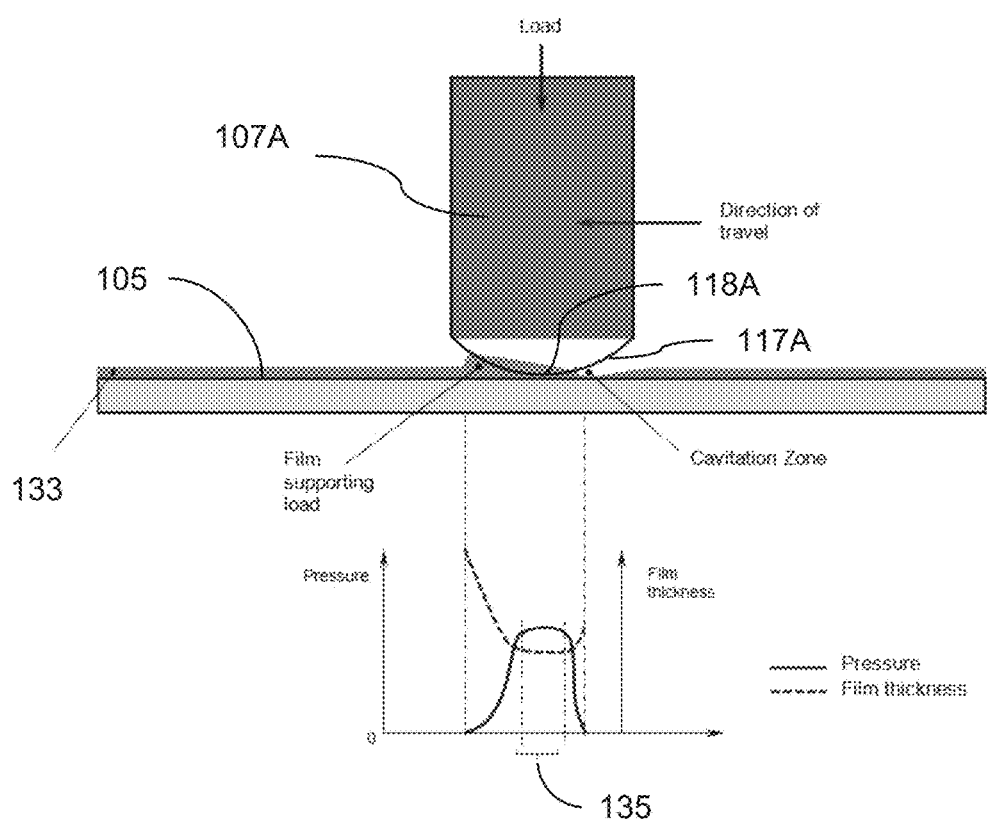
FIG. 4 shows a diagrammatic representation of a fluid film between a piston ring and an inner surface of a cylinder.

During operation of the engine, a lubricant film 133 may be formed between the circumferential surface of the piston ring 107 and the inner surface 105 of the cylinder 103, for example as a result of the motion between the respective surfaces. FIG. 4 shows a diagrammatic representation of the lubricant film 133 between the piston ring 107 and the inner surface 105 of the cylinder 103 as the piston ring 107 moves relative to the inner surface 105. The lubricant film 133 has a film thickness that is a function of the shape of the circumferential surface of the piston ring 107, the velocity gradient between the piston ring 107 and the inner surface 105, the shear stress in the lubricant, the dynamic viscosity of the lubricant, and/or the radial loading of the piston ring 107. In FIG. 4, the thickness of the lubricant film 133 varies between a maximum thickness in a convergence zone in front of the piston ring 107 and a minimum thickness in a divergence zone behind the piston ring 107, for example where the film 133 cavitates. In FIG. 4, the piston ring 107 is a barreled piston ring having a curved circumferential surface that deforms elastically under loading, which results in a portion of the circumferential surface being parallel with the inner surface 105 of the cylinder 103. As a result, the lubricant film 133 has a portion 135 of constant film thickness in the region where the circumferential surface is parallel with the inner surface 105. In order to prevent the lubricant from leaking out of the pocket, the pocket may be designed such that the overall dimension 131 of the pocket in the direction of travel of the piston 109 is less than the length of the portion 135 of the lubricant film 133 that has a constant film thickness.

By trapping lubricant, it is possible to ensure that the lubrication regime remains hydrodynamic and prevents contact between the piston rings 107 and the inner surface 105 of the cylinder 103, for example in those regions of the inner surface 105 where the speed of the piston 109 approaches zero.

Figure 5A:
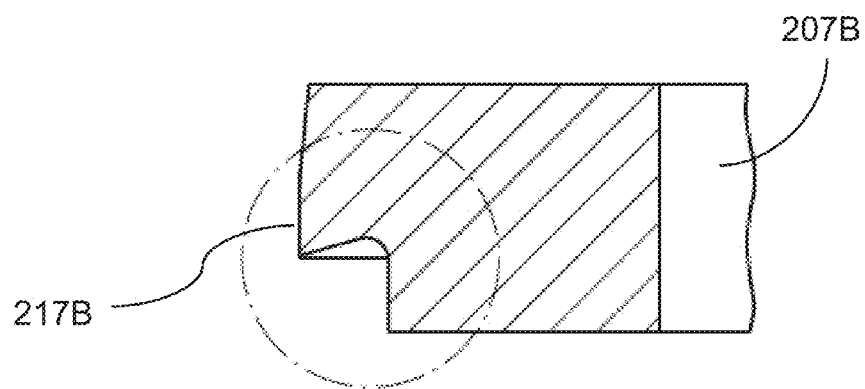
FIG. 5A shows a partial cross section of a piston ring according to the present disclosure.
Figure 5B:
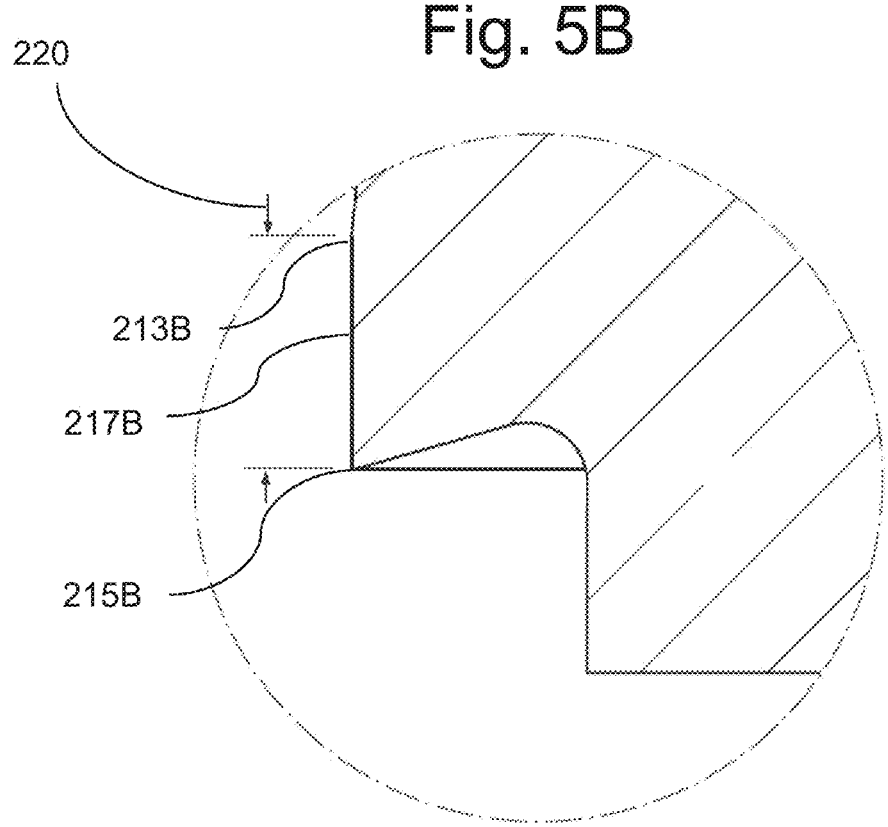
FIG. 5B shows a detailed view of the piston ring of FIG. 5A.

FIGS. 5A and 5B show detailed views of a piston ring 207 according to the present disclosure. The piston ring 207 may be a modified middle piston ring 207B configured to scrape or wipe oil from the inner surface 105 of the cylinder 103. The piston ring 207B has a contacting portion 217B of the circumferential surface configured to substantially engage the inner surface 105 of the cylinder 103, for example to establish a surface-surface interface between the contacting portion 217B of the circumferential surface and the inner surface 105. In this manner, the contact zone 111B between the middle piston ring 207B and the inner surface 105 of the cylinder 103 may be defined by a region bounded by the circumferential contacts between a top edge 213B of the contacting portion 217B and the inner surface 105, and a bottom edge 215B of the contacting portion 217B and the inner surface 105. It is noted that such a surface-surface interface is different from the prior art shown in FIGS. 2A and 2B, since the interface between the piston ring 107B and the inner surface 105 of the cylinder 103 is defined by a line contact, for example between the maximum diameter 118B of the middle piston ring 107B and the inner surface 105.

Figure 6A:
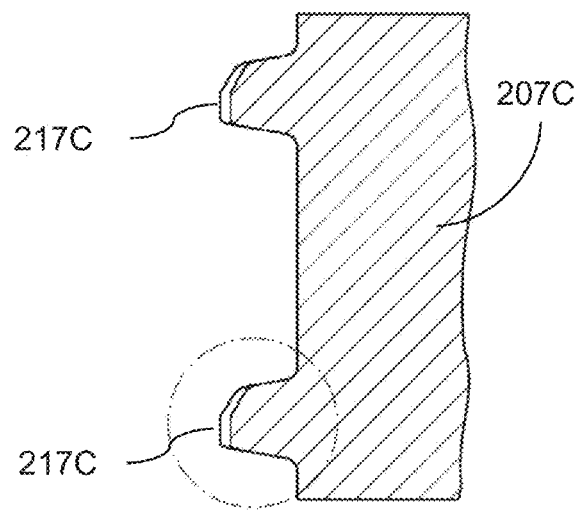
FIG. 6A shows a partial cross section of a piston ring according to the present disclosure.
Figure 6B:
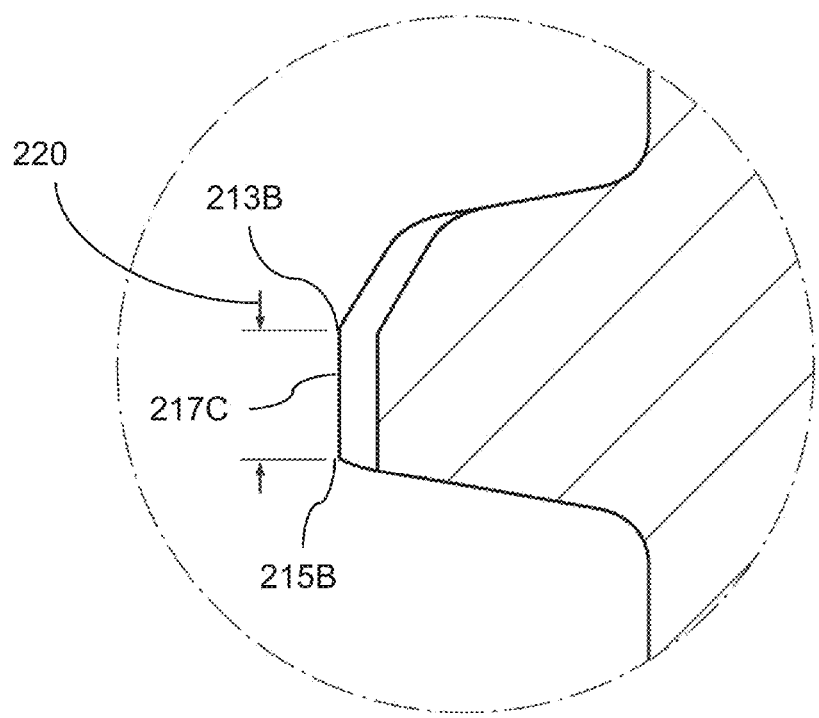
FIG. 6B shows a detailed view of the piston ring of FIG. 6A.

FIGS. 6A and 6B show detailed views of another piston ring 207 according to the present disclosure. The piston ring 207 may be a modified bottom piston ring 207C configured to control the amount of oil supplied to lubricate the contact between the piston rings 207 and the inner surface 105. In a similar manner to the middle piston ring 207C, the piston ring 207C has a contacting portion 217C of the circumferential surface configured to substantially engage the inner surface 105 of the cylinder 103, for example to establish a surface-surface interface between the contacting portion 217C of the circumferential surface and the inner surface 105. In this manner, the contact zone 111C between the bottom piston ring 207C and the inner surface 105 of the cylinder 103 may be defined by a region bounded by the circumferential contacts between a top edge 213C of the contacting portion 217C and the inner surface 105, and a bottom edge 215C of the contacting portion 217C and the inner surface 105. It is noted that such a surface-surface interface is different from the prior art shown in FIGS. 3A and 3B, since the interface between the piston ring 107C and the inner surface 105 of the cylinder 103 is defined by a line contact, for example between the maximum diameter 118C of the middle piston ring 107B and the inner surface 105.

In another arrangement (not shown), the piston ring 207 may be a modified top piston ring configured to provide a seal between the top and bottom of the cylinder 103 on either side of the piston 109. In a similar manner to the middle and bottom piston rings 207B, 207C, the top piston ring may comprise a circumferential surface configured to substantially engage the inner surface 105 of the cylinder 103, for example to establish a surface-surface interface between a contacting portion of the circumferential surface and the inner surface 105. The circumferential surface may comprise a flat portion of the curved, e.g. barreled, profile of the top piston ring. In this manner, the contact zone 111C between the top piston ring and the inner surface 105 of the cylinder 103 may be defined by a region bounded by the circumferential contacts between a top edge of the contacting portion of the circumferential surface and the inner surface 105, and a bottom edge of the contacting portion of the circumferential surface and the inner surface 105.

During operation of the engine, the piston rings 207 may become inclined to the operational axis of the piston 109 such that the only the contacting portion of the or each circumferential surface engages the inner surface 105 of the cylinder 103. It is understood therefore that the contact zone 111 between any one of the piston rings 207 may be defined by the portion of the circumferential surface of the piston ring 207 that engages the inner surface 105 of the cylinder 103.

Each of the piston rings 207 according to the present disclosure may be designed such that the circumferential surface is configured to provide a contact zone 111 having an overall dimension 220 in the direction of travel of the piston 109 that is greater than the dimension of the pocket, for example the dimension of the opening 131 of the recess 129, in the direction of travel of the piston 109. For example, the dimension 220 may be defined by the dimension of the contacting portion 217B, 217C of the circumferential surface of the piston ring 207B, 207C. In this manner, the piston rings are able to prevent lubricant from leaking out of the pockets as the piston rings travel over the pockets, thereby preventing the lubrication regime from transitioning into boundary lubrication from hydrodynamic lubrication. In this manner, the coefficient of friction is minimized by maintaining a lubrication regime that operates near to the minimum of the Stribeck curve during operation of the engine.

In certain arrangements, it may be particularly advantageous to control the ratio of the dimension 220 in the direction of travel of the piston 109 to the dimension 131 of the opening of the recess 129 in the direction of travel of the piston 109. For example, it may be advantageous to configure the piston rings 207 such that the ratio of the dimension of the contact zone 220 the direction of travel of the piston to the dimension 131 of the opening of the recess 129 in the direction of travel of the piston is in the range of approximately 5:1 to 5:3.

In one arrangement, the dimension 131 of the opening of the recess 129 in the direction of travel of the piston 109 may be approximately 60 microns. Correspondingly, the dimension 220 of the piston ring 207 in the direction of travel of the piston 109 may be in the range of 100 microns to 300 microns. However, the dimension 131 of the opening of the recess 129 in the direction of travel of the piston 109 is not limited to a size of 60 microns, and the opening of the recess 129 in the direction of travel of the piston 109 may be any appropriate dimension in order to ensure that the benefits derived from the present disclose are seen consistently across a range of different cylinder/piston ring applications.

In one arrangement, depending on the dimension 131 of the opening, it may be desirable to form the recesses 129 in the inner surface 105 of the cylinder using a laser ablation technique. Such a technique may be particularly suited to manufacturing recesses 129 in a cylinder bore, since it is difficult to manufacture the recesses 129 in the cylinder bore using standard machining techniques. However, one of the factors to consider when manufacturing the recesses 129 using laser ablation is the physical limitation on the diameter of the laser used to ablate material from the inner surface 105 of the cylinder 103. For example, it is difficult to obtain a focused laser beam of less than 20 microns in diameter, which determines the minimum possible size of the recess 129 in any dimension.

Another factor to consider when manufacturing the recesses 129 is the process time for forming a recess 129 in the inner surface of the cylinder using laser ablation. For example, the larger the recess 129 in the direction of travel of the piston 109, the greater the processing time, as more material needs to be removed from the inner surface 105 and/or the number of manufacturing steps has to be increased. Larger recesses 129 may take more time to make when using a lower powered laser in order to avoid adversely heating the material surrounding the recesses 129. Larger recesses 129 may be made more quickly using a higher powered laser to remove the material faster in a single operation, but may be followed by a mechanical operation to clean-up any material deposited onto the inner surface 105 as a result of the laser ablation. As such, it is desirable to manufacture the recesses 129 using a lower powered laser, which reduces heat input into the surrounding material, and to maintain the dimension of the recess 129 in the direction of the piston to a size of approximately 60 microns to avoid additional processing steps.

Another factor to consider when manufacturing the recesses 129 is the positional control of the laser itself, which is imposes another manufacturing tolerance on the size of the recesses 129. For example, during the manufacture of the recesses 129, it is difficult to control the positional accuracy of the laser below a tolerance of approximately +/−20 microns, whilst maintaining the required throughput on a production line.

Another factor to consider when manufacturing the recesses 129 is the material properties of the inner surface 105 of the cylinder, which are optimized for engine performance, and not recess manufacturability. One consideration is the grain structure of the material of the inner surface 105. For example, the inner surface 105 of the cylinder 103 may be made from a number of materials, including cast iron. For example, a cylinder block of the engine may be made entirely from cast iron, may have a cylinder liner made from cast iron, and/or may have a cylinder bore coated by an iron layer. For each condition, the grain structure and the material properties vary, with standard grey cast iron (typically ISO 520 grade) having the largest grain size and carbon flake size. The grain size varies and depends on the local cooling rate, but typically is in the range of 1 to 100 microns in size. The laser ablation process interacts with the material and particularly the graphite flakes, which conduct heat better than the metal structure, and as result the shape of the recess 129 may depend on the location and/or the size of the graphite flake in relation to the metal structure. In some cases, therefore, the edge of the opening 131 of the recess 129 may not have a straight edge, for example if the grain boundary of the material is close to the edge of the laser beam, as it will tend to remove material up to the grain boundary. This leads to difficulty in maintaining the desired dimensions of the recess 129. For example, if it is desired to obtain a recess 129 having a dimension of 60 microns in the direction of travel of the piston 109, a tolerance of +/−10 microns on each edge of the recess 129 would be needed to account for the interaction between the laser and the material structure, irrespective of the control behind the focal distance and other laser processing related process effects. It is therefore difficult to have a recess 129 smaller than 40 microns, i.e. 20 microns plus 10 microns on each side of the recess 129, from a material-laser interaction point of view.

Considering these factors when manufacturing a recess 129 of 60 microns, the actual size of the opening 131 of the recess 129 may be 60+/−40 microns. As such the maximum possible dimension of the opening may be 100 microns, and the minimum dimension of the opening may be 20 microns. Therefore, the minimum allowable dimension 220 of the contact zone in the direction of travel of the piston 109 should be 100 microns, in order to adequately seal the lubricant in the recess 129 as the piston ring 207 travels over the recess 129.

Taking the example of a recess 129 of 60 microns in the direction of travel of the piston 109, the present disclosure prescribes that the maximum dimension 220 of the contact zone should be 300 microns. One of the factors to consider when designing a piston ring 207, for example an oil scraper ring 207B or an oil control ring 207C, would be to minimise the contact area between the piston ring 207B, 207C and the inner surface 105 of the cylinder 103 to ensure that the oil on the inner surface 105 is controlled in a desired manner. In fact, the prior art of FIGS. 1 to 3B provides a line contact between the piston ring 107B, 107C and the inner surface 105 in order to maximise oil control capability and minimise friction between the piston ring 107B, 107C and the inner surface 105. However, such line contact does not allow fluid to be sealed in the recess 129 as the piston ring 107 107 travels over the recess 129.

One of the key factors in understanding the limits on the upper end of the range, i.e. 5:1, lies in determining the precise tribological interactions between the inner surface 105 and the circumferential surface of the piston ring 207. As such, there is a distinct balance between minimising the surface contact for oil control and maximising the surface contact for reduced friction, when recesses 129 are provided in the inner surface. In fact, there exists an unexpected benefit to the wear resistance of the inner surface when the size of the contact zone is increased. This unexpected benefit starts to wane at ranges more than 5:1.

Additional Statements of Invention

Statement 1. A piston ring for a piston, the piston ring having a circumferential surface configured to engage an inner surface of a cylinder, the inner surface having at least one recess indented into the inner surface, the engagement of the circumferential surface of the piston ring with the inner surface of the cylinder defining a contact zone therebetween, wherein the circumferential surface of the piston ring is configured such that the ratio of the dimension of the contact zone in the direction of travel of the piston to the dimension of the recess in the direction of travel of the piston is in the range of approximately 5:1 to 5:3.

Statement 2. A piston ring according to statement 1, wherein at least a portion of the circumferential surface of the piston ring is configured to be parallel to the inner surface of the cylinder during operation of the engine.

Statement 3. A piston ring according to statement 1 or 2, wherein the circumferential surface is configured to deform elastically upon engagement with the inner surface of the cylinder, the dimension of the contact zone in the direction of travel of the piston being defined by the dimension of the elastically deformed portion of the circumferential surface in the direction of travel of the piston.

Statement 4. A piston ring according to statement 3, wherein the dimension of the elastically deformed portion in the direction of travel of the piston is greater than the dimension of the recess in the direction of travel of the piston.

Statement 5. A piston ring according to any of the preceding statements, wherein a film of lubricant is provided in the contact zone between the circumferential surface of the piston ring and the inner surface of the cylinder during operation of the engine, the film of lubricant having a film thickness that is substantially constant in the direction of travel of the piston during operation of the engine.

Statement 6. A piston ring according to statement 5, wherein the circumferential surface of the piston ring is configured to support a film of lubricant having a dimension in the direction of travel of the piston that is greater than the dimension of the recess in the direction of travel of the piston.

Statement 7. A piston ring according to any of the preceding statements, wherein the piston ring comprises a plurality of the circumferential surfaces.

Statement 8. A piston ring according to any of the preceding statements, wherein the piston ring is a compression ring.

Statement 9. A piston ring according to any of the preceding statements, wherein the piston ring is an oil scraper ring.

Statement 10. A piston ring according to any of the preceding statements, wherein the piston ring is an oil control ring.

Statement 11. A machine and/or a vehicle comprising the piston ring of any of statements 1 to 10.

Statement 12. A method of forming a piston ring for a piston, the piston ring having a circumferential surface configured to engage an inner surface of a cylinder, the inner surface having at least one recess indented into the inner surface, the engagement of the circumferential surface of the piston ring and the inner surface of the cylinder defining a contact zone therebetween, the method comprising:
  determining the dimension of the recess in the direction of travel of the piston;
  and
  forming the piston ring so that the ratio of the dimension of the contact zone in the direction of travel of the piston to the dimension of the recess in the direction of travel of the piston is in the range of approximately 5:1 to 5:3.

Statement 13. A piston ring set for a piston, each of the piston rings having a circumferential surface configured to engage an inner surface of a cylinder, the inner surface having at least one recess indented into the inner surface, the engagement of the circumferential surface of each of the piston rings with the inner surface of the cylinder defining respective contact zones therebetween, wherein the circumferential surface of each of the piston rings is configured such that the ratio of the dimension of each contact zone in the direction of travel of the piston to the dimension of the recess in the direction of travel of the piston is in the range of approximately 5:1 to 5:3.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

The invention claimed is:

1. A machine comprising a cylinder and a piston ring set for a piston of the machine, the piston ring set comprising a first piston ring having a first profile, in a direction of travel of the piston, and a second piston ring having a second profile, in the direction of travel of the piston, the first and second profiles being different, each of the piston rings having a circumferential surface configured to engage an inner surface of the cylinder of the machine, the inner surface having at least one recess indented into the inner surface, the engagement of a contact portion of the circumferential surface of each of the piston rings with the inner surface of the cylinder defining respective contact zones therebetween, a remainder of the circumferential surface of each piston ring not engaging the inner surface, wherein a film of lubricant is formed between the circumferential surface and the inner surface within the contact zone, wherein the circumferential surface of each of the piston rings is configured to deform elastically and be parallel to the inner surface of the cylinder upon engagement with and radial loading against the inner surface of the cylinder during operation of the machine, a dimension of the contact zone in the direction of travel of the piston being defined by a dimension of the elastically deformed portion of the circumferential surface in the direction of travel of the piston, and wherein the contact portion of the circumferential surface of each of the piston rings is configured such that a ratio of a dimension of each contact zone in the direction of travel of the piston to a dimension of the recess in the direction of travel of the piston is in a range of 5:1 to 5:3.

2. The machine according to claim 1, wherein the inner surface has a plurality of recesses spaced apart from one another along the inner surface, in the direction of travel of the piston, each recess of the plurality of recesses having a dimension such that the ratio of the dimension of each contact zone in the direction of travel of the piston to the dimension of each recess in the direction of travel of the piston is in the range of 5:1 to 5:3.

3. The machine according to claim 1, wherein the remainder of the circumferential surface of each piston ring not engaging the inner surface is a non-contacting portion configured to be spaced apart from the inner surface of the cylinder during operation of the machine.

4. The machine according to claim 1, wherein the film of lubricant within the contact zone has a film thickness that is substantially constant in the direction of travel of the piston during operation of the machine.

5. The machine according to claim 4, wherein the circumferential surface of each of the piston rings is configured to support the film of lubricant having a dimension in the direction of travel of the piston that is greater than the dimension of the recess in the direction of travel of the piston.

6. The machine according to claim 1, wherein at least one of the piston rings comprises a plurality of the circumferential surfaces.

7. The machine according to claim 1, wherein at least one of the piston rings is a compression ring, an oil scraper ring, or an oil control ring having a barreled, tapered, or contoured profile, respectively, in the direction of travel of the piston.

8. The machine according to claim 1, wherein the first profile and the second profile are non-planar.

9. The machine according to claim 1, wherein the dimension of the recess is 60+/−20 µm and the dimension of each contact zone is in a range of 100 to 300 µm.

10. The machine according to claim 9, wherein the engagement between the contact portion of the circumferential surface of the first piston ring and the inner surface defines a first contact zone, wherein the engagement between the contact portion of the circumferential surface of the second piston ring and the inner surface defines a second contact zone, and wherein a ratio of the dimension of the recess in the direction of travel of the piston to a dimension of the first contact zone in the direction of travel of the piston is different to a ratio of the dimension of the recess in the direction of travel of the piston to a dimension of the second contact zone in the direction of travel of the piston.

11. The machine according to claim 10, wherein a profile of at least one of the piston rings comprises at least one of a curved portion, a flat portion, and a tapered portion.

12. The machine according to claim 11, wherein the circumferential surface comprises a plurality of projections.

* * * * *